US011790162B2

(12) United States Patent
Yamada

(10) Patent No.: US 11,790,162 B2
(45) Date of Patent: Oct. 17, 2023

(54) INFORMATION PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventor: Toshifumi Yamada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 470 days.

(21) Appl. No.: 16/892,293

(22) Filed: Jun. 4, 2020

(65) Prior Publication Data
US 2021/0165957 A1   Jun. 3, 2021

(30) Foreign Application Priority Data

Dec. 3, 2019  (JP) .................................. 2019-218820

(51) Int. Cl.
*G06F 40/186*  (2020.01)
*G06F 40/103*  (2020.01)
(52) U.S. Cl.
CPC .......... *G06F 40/186* (2020.01); *G06F 40/103* (2020.01)
(58) Field of Classification Search
CPC ............. G06F 40/103; G06F 40/186
See application file for complete search history.

(56) References Cited

U.S. PATENT DOCUMENTS

| | | | |
|---|---|---|---|
| 2016/0210224 A1* | 7/2016 | Cohen ................. | G06F 11/3684 |
| 2016/0267723 A1* | 9/2016 | Rajpathak ............. | G07C 5/008 |
| 2019/0108487 A1* | 4/2019 | Foss ...................... | H04L 51/046 |
| 2020/0159871 A1* | 5/2020 | Bowen ................... | G06T 11/60 |

FOREIGN PATENT DOCUMENTS

JP   2013057999   3/2013

OTHER PUBLICATIONS

Office Action of Japan Counterpart Application, with English translation thereof, dated Aug. 8, 2023, pp. 1-5.

* cited by examiner

*Primary Examiner* — Scott T Baderman
*Assistant Examiner* — Seung Woon Jung
(74) *Attorney, Agent, or Firm* — JCIPRNET

(57)  ABSTRACT

An information processing apparatus includes a processor configured to refer to definition information that defines a relationship between components allowed to be included in a template, and generate a second template by adding, to a first template, a component, of which a relationship with a component included in the first template present in the part corresponds to the allowed relationship defined by the definition information, among components which are included in a result of editing of a first document including a part copied from the first template and which are added to the part through the editing.

11 Claims, 12 Drawing Sheets

FIG. 2

```
<TEMPLATE ID = "0012"  NAME = "○○ TABLE"
VERSION = "1">
<TABLE>
 ..
</TABLE>
</TEMPLATE>
```
— 20

↓ EDITING

```
<TEMPLATE ID = "0012"  NAME = "○○ TABLE"
VERSION = "1">
<TABLE>
 ..
</TABLE>
<TITLE>TABLE 1.</TITLE>
</TEMPLATE>
```
— 22

COMPONENT IS ALLOWED TO BE ADDED BASED ON COMPONENT RELEVANCE TABLE
↓
NEW VERSION OF TEMPLATE IS CREATED AND REGISTERED

```
<TEMPLATE ID = "0012"  NAME = "○○ TABLE"
VERSION = "2">
<TABLE>
 ..
</TABLE>
<TITLE>TABLE 1.</TITLE>  ← 26
</TEMPLATE>
```
— 24

FIG. 3

|        | LIST | TABLE | FRAME | NOTICE |
|--------|------|-------|-------|--------|
| LIST   | C    | C     | C     | B      |
| TABLE  | B    | B     | A     | C      |
| FRAME  | B    | A     | A     | A      |
| NOTICE | A    | C     | B     | A      |
| TITLE  | C    | D     | A     | A      |

FIG. 4
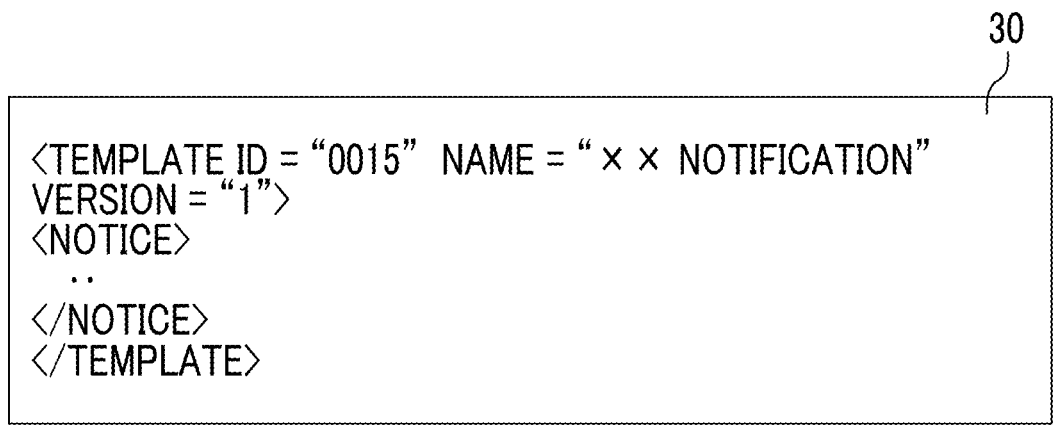
↓ EDITING
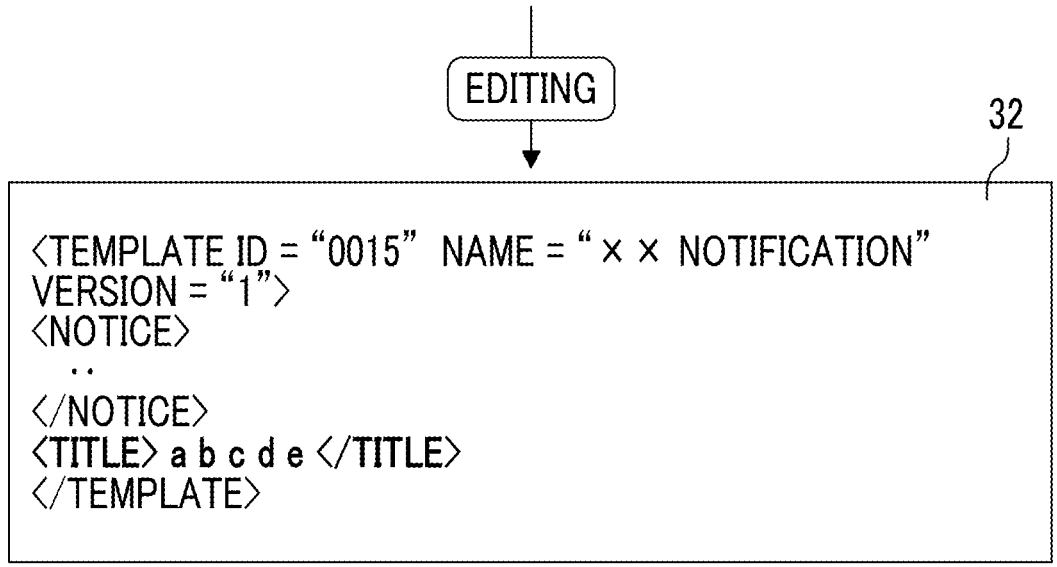
COMPONENT IS NOT ALLOWED TO BE ADDED BASED ON COMPONENT RELEVANCE TABLE
↓
NEW VERSION OF TEMPLATE IS NOT GENERATED

FIG. 5

```
<TEMPLATE ID = "0015"  NAME = "× × NOTIFICATION"
VERSION = "1">
<NOTICE>
  ..
</NOTICE>
</TEMPLATE>
```

↓ EDITING

```
<TEMPLATE ID = "0015"  NAME = "× × NOTIFICATION"
VERSION = "1">
<NOTICE>
  ..
</NOTICE>
<TABLE>
<FRAME></FRAME>
</TABLE>
</TEMPLATE>
```

TABLE ADDING IS OK, FRAME ADDING IS NG
↓
NEW VERSION OF TEMPLATE IS CREATED AND REGISTERED

```
<TEMPLATE ID = "0015"  NAME = "× × NOTIFICATION"
VERSION = "2">
<NOTICE>
  ..
</NOTICE>
<TABLE>
</TABLE>
</TEMPLATE>
```

FIG. 8

| CANDIDATE ID | STRUCTURE | NUMBER OF TIMES |
|---|---|---|
| 01234 | <LIST><br><LI>··<br><LI>··<br></LIST> | 15 |
| 01235 | <TABLE><br><FRAME></FRAME><br></TABLE> | 2 |
| ⋮ | ⋮ | ⋮ |

FIG. 11

| TEMPLATE NAME | CREATOR | CREATION DATE | TEMPLATE OUTLINE | UTILIZED DOCUMENT |
|---|---|---|---|---|
| PRODUCT FUNCTION INFORMATION | SATO | 10/22/2018 | DESCRIPTION OF FUNCTION OF A PRODUCT | A PRODUCT MANUAL<br>B PRODUCT MANUAL<br>C PRODUCT MANUAL |
| OPERATION ENVIRONMENT TABLE | SUZUKI | 01/10/2019 | ENVIRONMENT TABLE ABOUT OPERATION OF A PRODUCT | BASIC SPECIFICATION OF A PRODUCT |

FIG. 12

| Ver | CREATOR | CREATION DATE | BASE Ver | UTILIZED DOCUMENT | DIFFERENCE |
|---|---|---|---|---|---|
| 5 | YAMAMOTO | 2/15/2019 | 1 | A PRODUCT MANUAL | TITLE DELETION |
| 4 | KATO | 2/3/2019 | 2 | C PRODUCT MANUAL | LIST ADDITION |
| 3 | YAMADA | 1/8/2019 | 2 | B PRODUCT MANUAL | TITLE UPDATE |
| 2 | DANAKA | 11/02/2018 | 1 | A PRODUCT MANUAL | TITLE ADDITION |
| 1 | SUZUKI | 10/22/2018 | | A PRODUCT MANUAL | |

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2019-218820 filed Dec. 3, 2019.

BACKGROUND

(i) Technical Field

The present invention relates to an information processing apparatus and a non-transitory computer readable medium storing a program.

(ii) Related Art

In order to support the creation of a document, a template is provided. A user creates a separate document by selecting a template corresponding to the type of document he or she wants to create, opening the file of the template, and adding entries to the template.

There is also known a method of generating a template from a document created by a user. For example, JP2013-057999A describes a method of comparing a transmitted mail file with an edited mail file, deleting a character sting in a part having a difference, and saving the mail as a template.

SUMMARY

Aspects of non-limiting embodiments of the present disclosure relate to an information processing apparatus that generates a new template from a result of editing of a document including a template which includes a plurality of components.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to refer to definition information that defines a relationship between components allowed to be included in a template, and generate a second template by adding, to a first template, a component, of which a relationship with a component included in the first template present in the part corresponds to the allowed relationship defined by the definition information, among components which are included in a result of editing of a first document including a part copied from the first template and which are added to the part through the editing.

BRIEF DESCRIPTION OF THE DRAWINGS

Exemplary embodiment(s) of the present invention will be described in detail based on the following figures, wherein:

FIG. 2 is a diagram for explaining a specific example of a template and a case where a new version of the template is generated from a result of editing of a document in which the template is incorporated;

FIG. 3 is a diagram showing an example of a component relevance table;

FIG. 4 is a diagram for explaining another specific example of a template and a case where a new version of the template is not generated from a result of editing of a document in which the template is incorporated;

FIG. 5 is a diagram for explaining another example in which a new version of a template is generated from a result of editing of a document in which the template is incorporated;

FIG. 8 is a diagram showing a template candidate list;

FIG. 11 is a diagram showing an example of a template list;

FIG. 12 is a diagram showing an example of a version list; and

DETAILED DESCRIPTION

Example of Document Editing System

An example of a document editing environment to which processing of generating or updating a template according to the present disclosure is applied will be described with reference to FIG. 1.

Figure 1:
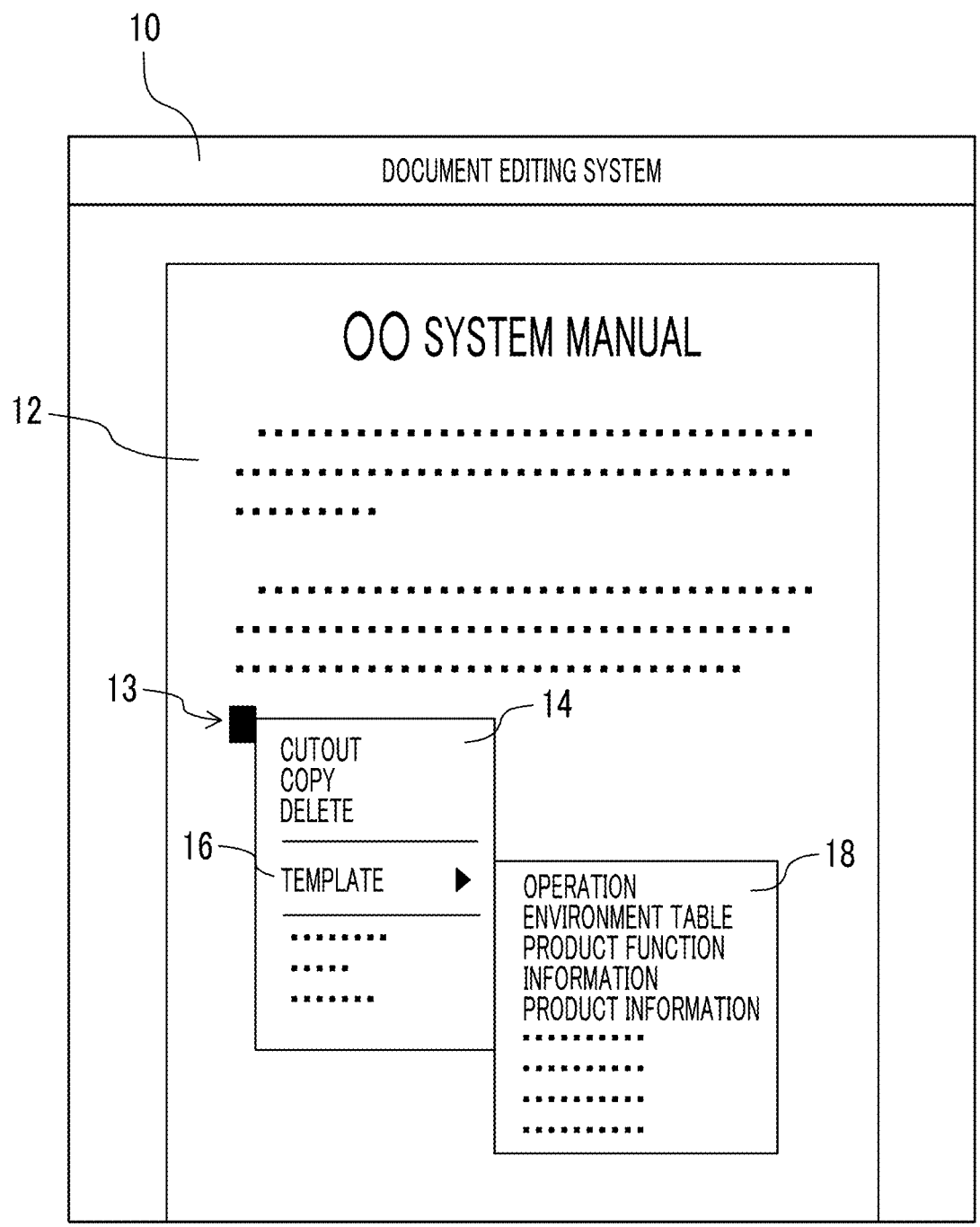
FIG. 1 is a diagram exemplifying a screen of a document editing environment provided by a document editing system.

FIG. 1 shows a screen 10 of a document editing environment provided by the document editing system. On the screen 10, a document 12 being edited is displayed.

The document to be edited is a structured document. The structured document is a document having a structure constituted of one or more components. The components that constitutes the structured document are also called elements. A tree structure of a component group is formed by arranging a plurality of components in parallel or by making one component include another component. The components that are the units of the document structure include, for example, bullet points (that is, lists), tables, box frames, character strings, and the like. The structured document is described using, for example, a markup language such as an extensible markup language (XML).

A user edits the document by inputting a text at the position of a cursor 13 in the document 12. In addition, the user adds a component in the document 12 by inputting a component such as a bullet point or a table at the position of the cursor 13. Since the newly added component does not include the content, the user further inputs the content such as a character string in the component. For example, in a case where a table is added to the document 12, a value in each cell of the added table is empty, and the user inputs a value to each cell.

The user is able to also add a template to the document 12. The template includes a structure constituted of one or more components. Some of the components in the template may include contents such as a character string.

In the example shown in the drawing, there is a command 16 for adding "template" to one of the items in the context menu 14 called up at the position of the cursor 13. In a case where the user selects this command 16, a template list 18 is displayed. In the template list 18, the names of the respective templates registered in the document editing system are displayed in a list. The user selects a template to be added to the document 12 from the template list 18. Thus, the selected template is copied to the position of the cursor 13 of the document 12 at the position of the cursor 13. That is, a part having the same content as the template is incorporated at the position of the cursor 13 in the document 12. The part corresponding to the selected template and incorporated in the document 12 in this manner is hereinafter referred to as a "template part". One document 12 may include a plurality of template parts.

Generation of Template Based on Document Editing Result

In the processing of editing, the user may add a component to the template part added in the document 12 or delete a component included in the template part. In the method of this exemplary embodiment, the original template is upgraded or a new template is generated on the basis of the edited template part.

The template 20 shown in FIG. 2 is configured as a component named "TEMPLATE". In the start tag "<TEMPLATE>" of the component "TEMPLATE", the identification information, the name, and the version number of the template 20 are included as an ID attribute, a NAME attribute, and a VERSION attribute, respectively. The ID of the exemplified template 20 is "0012", the name is "XX table", and the version number is "1". A component named "TABLE" is included between the start tag and the end tag "</TEMPLATE>" of the template 20. This component is a component indicating a table. In the tree structure of the component group in the template 20, the "TEMPLATE" component is a "parent" of the "TABLE" component, and conversely, the "TABLE" component is a "child" of the "TEMPLATE" component.

The template part corresponding to this template is added to the document 12, and the edited result is the template part 22 shown in FIG. 2. In the template part 22, a component named "TITLE" is newly added after the "TABLE" component. This component is a component indicating a title, and a character sting of the title (in this example, "Table 1.") is included between the start tag and the end tag of this component. The "TITLE" component is a "child" of the "TEMPLATE" component, and has a "sibling" relationship in the sense that the "TABLE" component has the same "parent" as the "TABLE" component.

In the example of FIG. 2, the description is not given for the sake of simplicity. In the template 20, for example, a character string of a heading of each row and each column of the component "TABLE" is set, but the value of each cell of rows and columns is blank. The user inputs a value to each cell in the table shown in the part where the template 20 is incorporated in the document 12 (that is, the template part 22), thereby completing the table. Further, the user adds a "TITLE" component indicating the title of the table, and inputs a character string of the title in the component.

The template management function of the document editing system generates a template 24, which is an updated version of the original template 20, on the basis of the template part 22 edited as described above. The generated template 24 is obtained by adding a "TITLE" component 26 to the template 20 at a position next to the "TABLE" component.

In the example of FIG. 2, the "TITLE" component 26 added to the template part 22 through editing is incorporated in the new version of the template 24. However, there is no point in providing a template unless the template is frequently used later. For example, in a case where there is a component (hereinafter, referred to as "component A") added to the template part 22 due to the unique circumstances of the document 12, even in a case where a template including the component A is provided as a new version, it is expected that the new version is not used much. The reason for this is that the new version includes the component A, which is generally less necessary. In a case where a certain user incorporates the new version of the template into his/her own document, it takes extra time to delete the unnecessary component A. For this user, the original version of the template that does not include the component A is more convenient.

Therefore, the template management function of the present exemplary embodiment is for selecting components to be included in the new version of the template 24 among components added through editing (that is, components not included in the original template 20). For this selection, the template management function refers to the component relevance table shown in FIG. 3. The component relevance table is a table indicating the probability of appearance in the document group, that is, the frequency of appearance in the relationship between two adjacent components in the template part 22 (that is, the combination). In consideration of the frequency of appearance, the population of the document group is, for example, a document group saved in a document database in an organization using the document editing system, a document group hitherto edited by the document editing system, or the like. However, the document groups are just examples. The component relevance table is stored in the document editing system, or is stored on any server on the network in a state where the table is able to be referred to from the template management function.

In the component relevance table shown in FIG. 3, the probability of appearance in the document of the relationship between two adjacent components in a sibling relationship in the template part 22 is indicated by four-stage symbols of "A", "B", "C", and "D". In the example shown in the drawing, the components shown in the items on the horizontal axis are components located on the upper side (that is, the side closer to the beginning of the document) in the template part 22 in the document, and the components shown in the items on the vertical axis are components adjacent to the components on the horizontal axis on the lower side in a sibling relationship. The symbol "x" indicates that the probability of appearance is within the lowest range, and the probability of appearance indicated by each symbol increases in the order of "B", "C", and "D". That is, in a case where three threshold values, that is, a first threshold value <a second threshold value <a third threshold value, are used, "A" indicates a range in which the probability of appearance is less than the first threshold value, "B" indicates a range in which the probability of appearance is equal to or greater than the first threshold value and less than the second threshold value, "C" indicates a range in which the probability of appearance is equal to or greater than the second threshold value and less than the third threshold value, and "D" indicates a range in which the probability of appearance is equal to or greater than the third threshold value. For example, while a relationship corresponding to "A" is unlikely to appear (for example, there is almost no example in the past), a relationship corresponding to "D" is highly likely to appear. For example, a probability of appearance of a sibling relationship in which a "NOTICE" component is located immediately below a "LIST" component is very low, whereas a probability of appearance of a sibling relationship in which a "TITLE" component is located immediately below a "TABLE" component is very high.

Although the component relevance table shown in FIG. 3 is for components adjacent in a sibling relationship, the template management function of the document editing system additionally has a component relevance table for components adjacent in a parent-child relationship. The relationship between the "TEMPLATE" component and the "TABLE" component below the "TEMPLATE" component in the example of FIG. 2 is an example of components that are adjacent in a parent-child relationship.

The component relevance table may be created by the template management function vendor on the basis of own knowledge of the vendor. In addition, by investigating document group used in organizations that use the document editing system and performing machine learning using the document group, a component relevance table based on the statistics of the previous document group may be created. In addition, as the user creates a document using the template in the document editing system, the component relevance table may be updated on the basis of the contents of the change in the template part in the document (refer to the example of the flowchart of FIG. 7).

For example, in a case where the probability of appearance of the relationship between two components in the component relevance table is equal to or greater than a predetermined determination threshold value, the template management function determines that the relationship is a relationship that is allowed to be included in the template (hereinafter, such a relationship is also referred to as an "allowed relationship"). Conversely, in a case where the probability of appearance of the relationship between the two components is less than a predetermined determination threshold value, the relationship is determined to be a relationship that is not allowed to be included in the template. In a case where it is determined that the relationship between the component added through editing and the component before or after the editing is the relationship allowed to be included in the template, the template management function generates a new version of the template including the added component.

The set of the determination threshold value and the component relevance table is an example of definition information that defines a relationship between components allowed to be included in the template.

Hereinafter, in the case of using the component relevance table shown in FIG. 3, description will be given of some specific examples in a case where the determination threshold value is set as a boundary value (that is, the second threshold value in the example) between a range of the probability of appearance corresponding to the symbol "C" and a range of the probability of appearance corresponding to the symbol "A".

In this case, in the example of FIG. 2, a "TITLE" component is added in a sibling relationship subsequent to the "TABLE" component which is originally in the template.

However, the probability of appearance of the relationship is represented by "D" in the component relevance table of FIG. 3, and is higher than the determination threshold value. Therefore, it is allowed to add the "TITLE" component of the sibling relationship subsequent to the "TABLE" component in the template, and as a result, a new version of the template 24 to which the "TITLE" component is added is generated. The version value of the template 24 is "2" while the version value of the original template 20 is "1".

In another example shown in FIG. 4, in the original template 30, a "TEMPLATE" component includes a "NOTICE" component as a child component. The template 30 is incorporated in a document and edited by the user. As a result, a template part 32, in which a "TITLE" component is added subsequent to the "NOTICE" component in a sibling relationship, is generated. The probability of appearance of the sibling relationship is represented by "A" in the component relevance table of FIG. 3, and is lower than the determination threshold value. Therefore, it is not allowed to add a sibling "TITLE" component subsequent to the "NOTICE" component in the template. In a case where only the "TITLE" component of the edited template part 32 is added to or subtracted from the original template 30, a new version of the template based on the template part 32 is not generated.

FIG. 5 shows an example in which two components are added to the template 30 described above. In this example, the template 30 is incorporated in a document and edited by the user. As a result, a template part 34 is generated. In this template part, the "TABLE" component is added in a sibling relationship subsequent to the "NOTICE" component, and a "FRAME" component is added subsequent to the "TABLE" component as a child of the "TABLE" component. In FIG. 5, the contents of each component such as a "FRAME" component are omitted to avoid complexity. The probability of appearance of the sibling relationship in which the "TABLE" component is located subsequent to the "NOTICE" component is represented by "C" in the component relevance table of FIG. 3, and is higher than the determination threshold value. For this reason, it is allowed to add the "TABLE" component of the sibling relationship subsequent to the "NOTICE" component in the template. On the other hand, in the component relevance table for the parent-child relationship not shown, the probability of appearance of the parent-child relationship in which the "TABLE" component is the parent and the "FRAME" component is the child is represented by "B". In this case, it is not allowed that the parent-child relationship is included in the template. Therefore, in the example of FIG. 5, a new version of the template 36 that includes the added "TABLE" component but does not include the "FRAME" component is generated.

The examples of FIGS. 2, 4, and 5 are examples in which a new component (that is, a component that is not in the original template) is added subsequent to an existing component in the template. However, even in a case where a new component is added previous to the existing component in the template, a similar method can be applied. That is, in a case where there is a new component in the template part after editing, it is determined whether the relationship between the component and the existing component (that is, the component in the original template) located subsequent to the component corresponds to the "allowed relationship", on the basis of the component relevance table and the determination threshold value. In a case where it is determined that the relationship corresponds to the "allowed relationship", a new version of the template including the new component is generated. In a case where the relationship does not correspond to the "allowed relationship", the new component is not included in the new version of the template.

In the above description, an example in which a component is added to a template part in a document has been described. However, also in a case where an existing component included in an original template is deleted from the template part, a similar method can be applied. That is, in a case where there is no component in the edited template part that is in the original template, it is determined whether the relationship between the component and the existing components located previous and subsequent to the component corresponds to the "allowed relationship", on the basis of the component relevance table and the determination threshold value. In a case where it is determined that the relationship does not correspond to the "allowed relationship", a new version of the template without the deleted component is generated. The reason for this is as follows. Since the original template that includes the deleted component is a special one including a sequence of components that are statistically hard to use, it is considered that the template without the deleted component is statistically easy to use. In a case where the relationship between the component and the existing component located previous or subsequent to the component corresponds to the "allowed relationship", the template including the deleted component is statistically easy to use. Therefore, in that case, a new version of the template from which the component is deleted is not generated.

Further, in the component relevance table shown in FIG. 3, the probability of appearance of the relationship between two components is classified in four stages, but this description is just an example. The component relevance table may represent the probability of appearance of the relationship between two components by a numerical value.

Example of Hardware Configuration

The template management function of the document editing system exemplified above is realized by causing a computer to execute a program indicating the function. This computer may be the same as or different from the computer constituting the document editing system.

Figure 6:
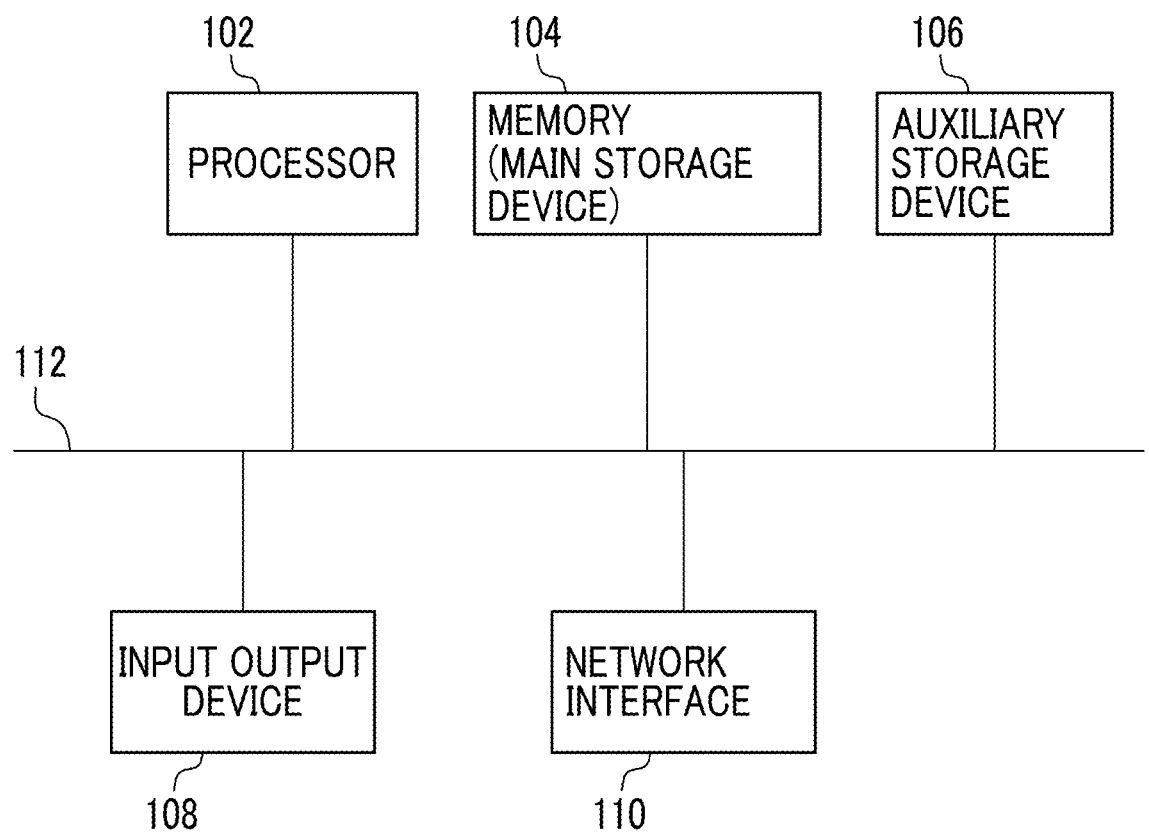
FIG. 6 is a diagram showing a hardware configuration of a computer in which a template management function of the document editing system is implemented.

Here, for example, as shown in FIG. 6, the computer has a circuit configuration in which hardware elements are connected through a data transmission path such as a bus 112. The hardware elements include, for example, a processor 102, a memory (main storage device) 104 such as a random access memory (RAM), a controller that controls an auxiliary storage device 106 such as a flash memory, a solid state drive (SSD), and a hard disk drive (HDD), an interface with various input output devices 108, a network interface 110 that controls connection to a network such as a local area network, and the like. A program describing the processing contents of each function of the template management function of the document editing system (or the processing contents of the document editing system itself) is installed in a computer through a network or the like, and is stored in the auxiliary storage device 106. The program stored in the auxiliary storage device 106 is executed by the processor 102 using the memory 104, thereby realizing the new version template generation processing through the template management function described above. The auxiliary storage device 106 stores a template group, a component relevance table, a determination threshold value, and the like registered in the component editing system.

In the embodiments above, the term "processor" 102 refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" 102 is broad enough to encompass one processor or plural processors in collaboration which are located physically apart from each other but may work cooperatively. The order of operations of the processor 102 is not limited to one described in the embodiments above, and may be changed.

Example of Processing Procedure

Figure 7:
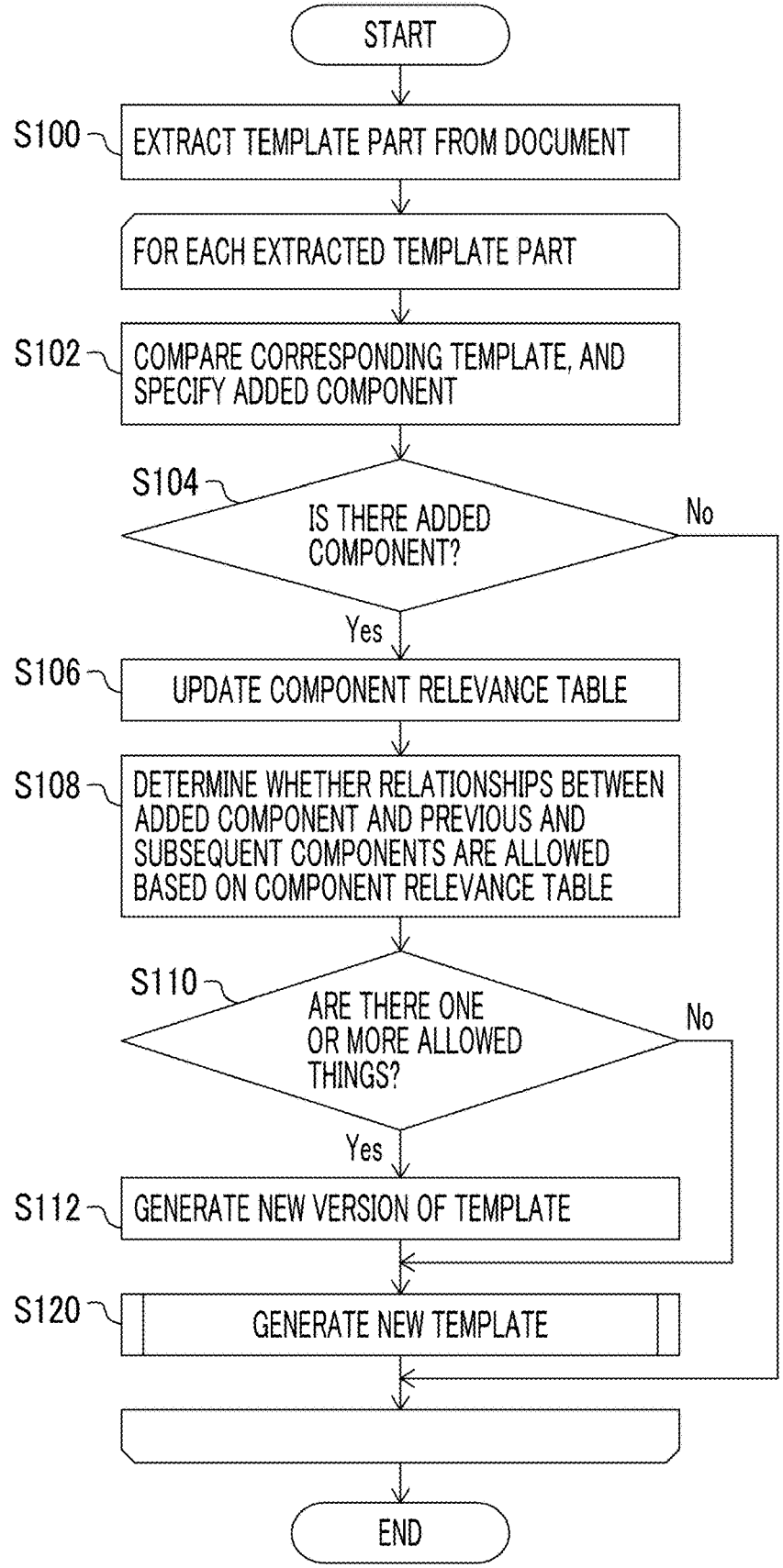
FIG. 7 is a diagram showing a procedure of processing of generating a new version of a template.

Next, an example of a processing procedure executed by the processor 102 to implement the template management function described above will be described with reference to FIG. 7. The procedure in FIG. 7 is executed, for example, in a case where the user finishes editing a document and gives an instruction to save the document in the file system.

In this procedure, the processor 102 extracts a template part from a document for which a save instruction is issued (S100). In this step S100, the processor 102 extracts from the document a template part surrounded by a start tag <TEMPLATE> and a first end tag </TEMPLATE> appearing thereafter. In a case where the document includes a plurality of template parts, each of the template parts is extracted.

Next, the processor 102 performs the processing of S102 to S120 for each extracted template part.

In this series of processing, first, the processor 102 compares the extracted template part with the corresponding original template. Then, by this comparison, the component added to the template part by the current editing (that is, the editing from the previous saving of this document in the file system until the current saving) is specified (S102). In step S104, for example, the processor 102 reads a template ID and a version number from the start tag of the template part, and retrieves an original template corresponding to the combination from the template group in the document editing system. The retrieved template is the original template corresponding to the template part. The processor 102 compares the tags of the original template and the template part so as to specify a component added through editing (that is, a component not included in the template but included in the template part).

Next, the processor 102 determines whether one or more added components are found as a result of S102 (S104). In a case where there is no added component (that is, the determination result of S104 is No), the processor 102 skips the processing of S104 to S120 and ends the processing of the template part as a current processing target.

In a case where the determination result in S104 is Yes, the processor 102 updates the component relevance table so as to reflect the specified added component (S106). For example, in the component relevance table, the processor 102 specifies a cell corresponding to the relationship between the specified added component and the component previous to the specified component, and a cell corresponding to the relationship between the added component and the component subsequent to the added component. Then, for each of the specified cells, the number of appearances of the relationship indicated by the cell is increased by one. This number of appearances corresponds to the numerator of the calculation expression of the probability of appearance of the cell (=number of appearances/total number). At this time, the processor 102 also increases the value of the total number corresponding to the denominator of the calculation expression by one. The total number is, for example, the total number of times the document is stored in the document editing system. Then, the processor 102 updates the probability of appearance of the cells in the component relevance table by recalculating the probability of appearance of the specified cells using the calculation expression. In a case where there are a plurality of added components in the template part, the processing of S106 is executed for each of the added components.

The above-described processing of updating the component relevance table is just an example. For example, instead of this, every time a template part is extracted in S100, the total number of the above-mentioned calculation expressions is increased by one, and the number of appearances of the relationship is increased by one for each relationship between adjacent components appearing in the template part. The probability of appearance of each cell may be updated on the basis of the numerical values after the increase.

Next, the processor 102 executes the processing of step S108 for each of the added components specified in step S102 (hereinafter, referred to as additional components). In step S108, the processor 102 determines whether the relationships between the additional component and the components previous and subsequent to the additional component correspond to the "allowed relationship" in which it is allowed that the relationship is included in the template, on the basis of the component relevance table after the update. In a case where it is determined that at least one of the relationship between the additional component and the previous component and the relationship between the additional component and the subsequent component is the "allowed relationship," the additional component is added to the new version of the template. Conversely, in a case where it is determined that both the relationship between the additional component and the previous component and the relationship between the additional component and the subsequent component are not "allowed relationships," the additional component is not incorporated in the new version of the template.

The processor 102 determines whether it is determined in step S102 that one or more relationships between the previous and subsequent components within one or more specified additional components are the "allowed relationship" (S110). In a case where the result of this determination is Yes, the processor 102 generates a new version of the template which includes additional components relating to the relationship determined as the "allowed relationship" but does not include additional components relating to the relationship not determined as the "allowed relationship" (S112). The generated new version of the template is registered in the document editing system. The generated new version of the template is obtained by adding an additional component relating to the relationship determined as the "allowed relationship" to the original template of the old version. Here, the processor 102 deletes the contents included in the additional component in the template part corresponding to the template in the edited document from the additional component added to the new version. However, a specific type of component (for example, TITLE) may be determined in advance such that contents thereof are also included in the new version of the template.

The original template, which is the old version, may be left in the document editing system even after the new version is registered. The new version template has the same template ID as the old version template, but the version number of the new version is greater than the version number of the old version. Therefore, the new version and the old version are associated with each other by having the same template ID. Alternatively, the template of the old version in the document editing system may be deleted and replaced with the template of the new version. After step S112, the processor 102 proceeds to step S120.

In the above example, the processor 102 automatically registers the new version of the template generated in step S112 in the document editing system, but this description is just an example. Alternatively, the processor 102 may display an inquiry screen as to whether or not to register a new version on a document editing screen provided to the user. Then, in a case of receiving an instruction to register from the user on the inquiry screen, the processor 102 may register the new version in the document editing system. The new version of the template generated in S112 may be displayed on the inquiry screen. In a case where an instruction not to register is received from the user on the inquiry screen, the processor 102 does not register the new version of the template in the document editing system. In a case where a new version of the template is registered in the document editing system, the processor 102 may change the version number in the start tag of the template part to be processed in S102 to S112 to the new version number.

In a case where the result of the determination in step S110 is No, there is no additional component allowed to be included in the new version of the template, and therefore, the processor 102 does not generate the new version of the template. That is, the processor 102 skips step S112 and proceeds to step S120.

In S120, the processor 102 performs processing of generating a new template. The new template here is not a new version of the existing template but an entirely new template. In a case where it is determined that the structure formed of a series of components added to the document through this editing (hereinafter referred to as an "added component structure") will be frequently used in the future, the added component structure is registered as a new template in the document editing system. The component structure added to a document is a structure formed by components that are added to the document and that are arranged consecutively to each other. Examples of the added component structure include: a structure in which components added to a document are consecutively arranged in a sibling relationship with each other; a structure in which a separate added component is included in a parent-child relationship among components added to a document; and a structure in which such a sibling relationship structure and such a parent-child relationship structure are consecutively arranged.

The component structure includes a plurality of consecutive (that is, adjacent) components, and a single component is not a component structure. In a case where the component added to the template part is not consecutive with other added components, the added component is not "added component structure". Further, the component structure does not include the contents of individual components. However, the contents of a predetermined specific type of component (for example, TITLE) may be included in the type of component in the component structure.

In this example, in the editing of the previous document group by various users, in a case where it is detected that the same component structure is added a certain threshold value number of times or more, it is determined that the component structure is "frequently used in the future". As a result, a new template indicating the component structure is generated.

To manage the processing of generating a new template, the template management function of the document management system holds a template candidate list, which is exemplified in FIG. 8, in the auxiliary storage device 106. FIG. 8 shows a template candidate list. This list holds data of candidate ID, structure, and number of times for each partial structure that is a candidate for a new template. The candidate ID is identification information of the partial structure that is a candidate for a new template. The structure is the component structure. The number of times is the number of times the component structure is added in editing of a previous document group performed by various users. This number of times may be a simple cumulative number of times. As another example, the number of times may be the number of times the component structure is added in the editing of the document group performed within the latest period of the predetermined length. In a case where the number of times within the period of the predetermined length is large, it can be said that the demand for the component structure is high.

Figure 9:
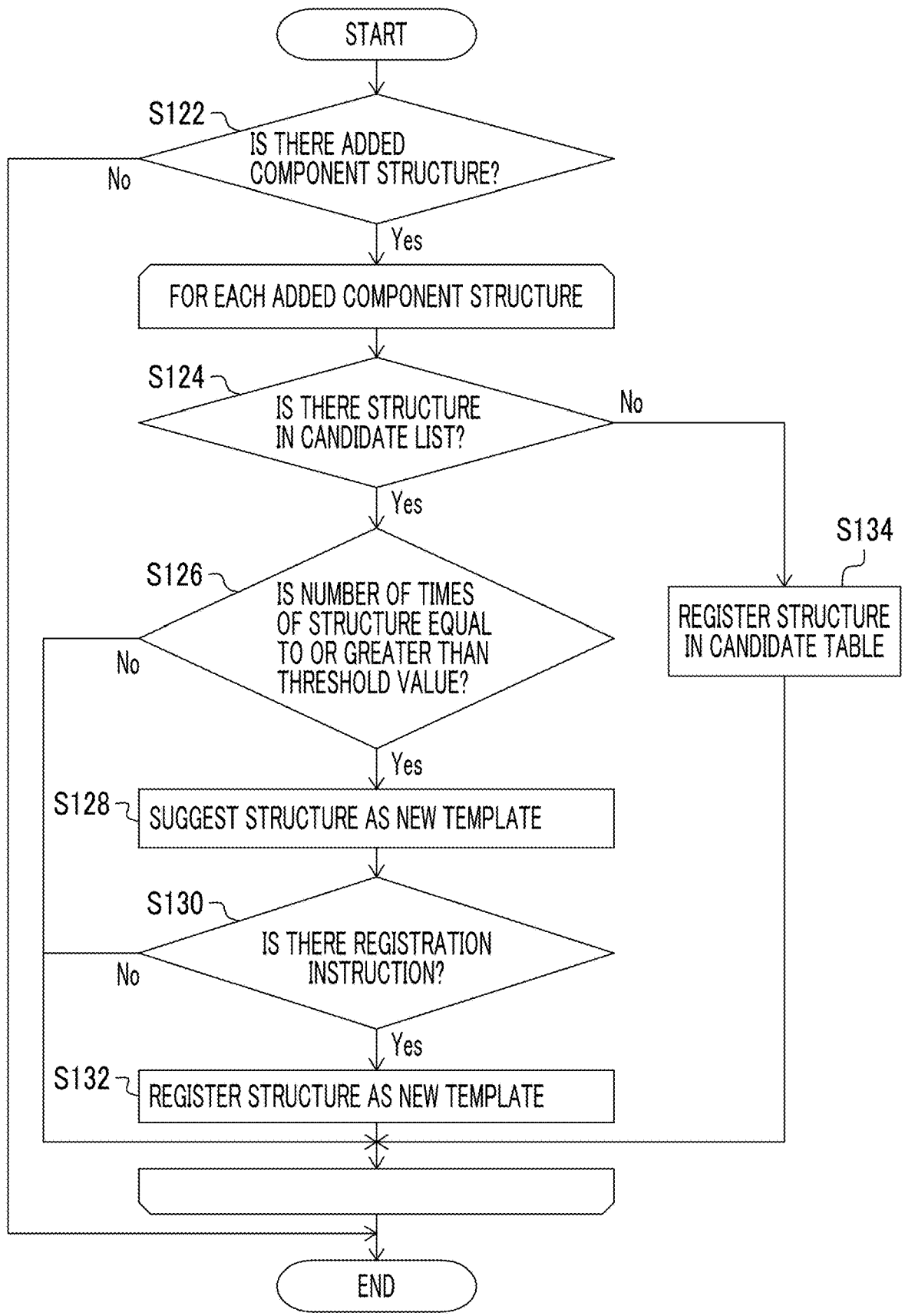
FIG. 9 is a diagram showing a procedure of processing of generating a new template.

Referring to FIG. 9, a detailed procedure of the processing of step S120 will be exemplified. In this procedure, first, the processor 102 determines whether there is a component structure added by the current editing in the template part to be processed (S122). In a case where there is no such component structure, the processing in FIG. 8 ends.

In a case where the determination result in step S122 is Yes, the processor 102 executes the processing of S124 to S134 for each added component structure found from the template part. That is, the processor 102 checks whether the partial structure is registered in the template candidate list (S124). In a case where the result of the determination in step S124 is No, that is, in a case where the partial structure is not in the template candidate list, the processor 102 assigns a unique template ID to the partial structure and registers the partial structure in the template candidate list. At this time, the number of times of the partial structure is set to one.

In a case where the determination result of step S124 is Yes, the processor 102 increases the number of times of the partial structure shown in the template candidate list by 1, and determines whether or not the number of times after the increase is equal to or greater than a predetermined threshold value (S126). In a case where the result of this determination is Yes, it can be said that the demand for a template having that partial structure is high. In this case, the processor 102 displays a suggestion screen for giving suggestion to register the partial structure as a new template on the document editing screen provided to the user (S128). This screen displays the component structure (for example, a row of the tag group of each component). The suggestion screen displays a graphical user interface (GUI) for receiving an instruction as to whether or not to register this component structure as a new template, for example, an OK button to register and a cancel button to not register. The user inputs an instruction on whether or not to register on the suggestion screen. The processor 102 determines whether or not the instruction which is input from the user indicates registration (S130). In a case where the instruction indicates registration, the processor 102 registers the partial structure as a new template in the document editing system (S132). At this time, the processor 102 receives the input of the name of the new template performed by the user. The version number of the registered new template is set to the initial value "1", and the name received from the user is incorporated in the new template as the value of the "NAME" attribute. In a case where the result of the determination in step S130 is No, the processor 102 skips step S132 and ends the processing of the partial structure.

Figure 10:
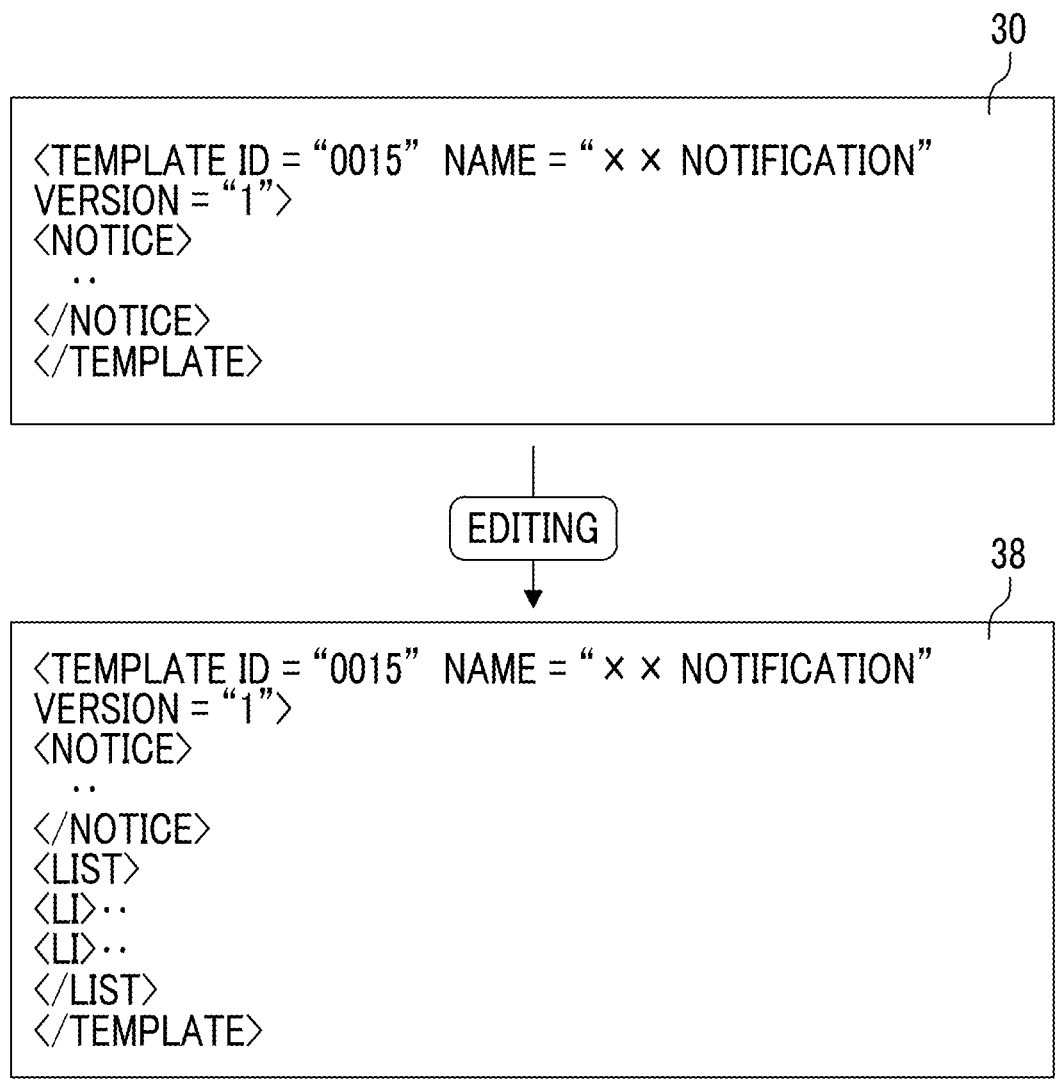
FIG. 10 is a diagram for explaining an example in which a new template is generated from a result of editing of a document in which the template is incorporated.

The processing procedure of the template management function has been exemplified above. In the example shown in FIG. 10, the template 30 also shown in FIG. 4 is incorporated in a document, and the incorporated part becomes a template part 38 through editing performed by the user. In this template part 38, a list component "LIST" including two list item components "LI" is added next to the "NOTICE" component.

In this example, the probability of appearance of the sibling relationship between the "NOTICE" component and the next "LIST" component is represented by "B", and is less than the determination threshold value in the above-described example. Therefore, a new version of the template, to which the "LIST" component is added, is not generated.

On the other hand, the added "LIST" component includes the list item component "LI" therein, and thus corresponds to the component structure. Here, in a case where it is found from the template candidate list that the number of times the same component structure as the component structure of the "LIST" component is added reaches the threshold value, generation of a new template indicating this component structure is suggested to the user.

In the example of FIG. 9, only the partial structure added to the template part in the document is targeted, but this is just an example. Alternatively, a partial structure added to a part other than the template part in the edited document may be used as a new template candidate.

Further, in the procedure shown in FIG. 7, in generating the new version of the template, the components added to the template part are considered, but further the components deleted from the template part (hereinafter referred to as deleted components) may be considered. In a case where there is a deleted component, that is, a component that is present in the original template but is not present in the edited template part, whether or not to generate a new version of the template reflecting the situation may be determined on the basis of the component relevance table and the like.

In the example in which the deleted components are considered, the procedure in FIG. 7 is changed as follows, for example. That is, in step S102, the processor 102 specifies both the additional component and the deleted component by comparing the processing target template part with the corresponding original template. Instep S104, the processor 102 determines whether there is one or more specified additional components or deleted components. In step S106, it is not necessary to update the probability of appearance of the cell in the component relevance table corresponding to the relationship between the specified deleted component and the previous and subsequent components, or the probability of appearance maybe updated to be reduced (for example, only the total number may be increased, and the number of appearances of the cell may be maintained, and so on).

In step S108, for each deleted component, the processor 102 determines whether or not to reflect the deletion of the deleted component in the new version of the template on the basis of the relationship between the deleted component and the previous and subsequent components, the component relevance table, and the determination threshold value. For example, for two relationships between the deleted component and the components previous and subsequent to the deleted component, in a case where the probability of appearance of the relationship indicated by the component relevance table is equal to or less than the determination threshold value, the processor 102 determines that the deleted component may be deleted from the template of the new version. The reason for this is that a template without the deleted component is considered to be more demanded by the user.

In step S110, it is determined whether at least one of the following is established: there is an additional component of which the relationship with the previous and subsequent components corresponds to the "allowed relationship"; and there is a deleted component for which it is determined that the deleted component may be deleted from the new version of the template.

The processing of other steps may be the same as the processing described above.

It should be noted that the determination threshold value used for determining the deleted component may be the same as or different from the determination threshold value used for determining the additional component. Further, the component relevance table used for determining the deleted component may be the same as or different from the component relevance table used for determining the additional component.

Further, as a further modification example of the procedure of FIG. 7, for a specific type of component whose component content is included in the template, in a case where the content of the component is changed by editing the corresponding template part, the content change may be reflected in a new version of the template. An example of such a particular type of component is a "TITLE" component. In this modification example, in step S102, the processor 102 checks whether there is a specific type of component whose content is changed in the template part. In a case where a component that satisfies this condition is found, the result of the determination in step S104 is Yes, and the processor 102 skips steps S108 and S110 and generates a new version of the template reflecting the change in the content in step S112.

Next, with reference to FIGS. 11 to 13, an example of a UI for using a template provided by the document editing system will be described.

In this example, in a case where the processor 102 of the document editing system receives an instruction from the user to incorporate a template at a cursor position in a document, the template list shown in FIG. 11 is displayed on a document editing screen. The displayed template list shows information on each template registered in the document editing system. That is, in the template list, a group of templates that can be incorporated in the document is shown as options. In this example, the template list includes, for each template, items of a template name, a creator, a creation date, a template outline, and a utilized document. The template name is a name of the template. The creator indicates information of a user who creates the first version of the template (for example, a user name), and the creation date indicates a date when the first version of the template is created. The template outline indicates outline information that is used as a reference for the user to determine whether to use the template, such as the purpose of use of the template. For example, the creator of the template inputs the template outline. The utilized document indicates a list of document names of documents in which the template is incorporated. For example, the template "product function information" is used in three documents, "A product manual", "B product manual", and "C product manual".

In a case where a user selects one template on the displayed template list, the processor 102 displays a version list of the template. FIG. 12 shows a version list of the template "product function information". The version list includes items of Ver (=version number), creator, creation date, base Ver, utilized document, and difference for each version of the current template. The creator is the creator of the current version. In a case where the current version is generated from the result of editing a document in which the original version of the template is incorporated, the creator of the current version and the user who edits the document. The creation date is the date when the current version is created.

The base Ver is the number of the version on which the current version is based, the utilized document is the document name of the document in which the current version is incorporated, and the difference is the difference between the current version and the version on which the current version is based. For example, the version 1 of the template "product function information" is incorporated in a certain document A, and a component X is added to the template part corresponding to the version 1 in the document A through editing. As a result, a case where a new version of the template is generated is taken into consideration. In this case, the new version is added to the version list of the template. The base Ver of the new version is the version 1, the utilized document is the document A, and the difference is the "add component X".

The user selects a version to be added to the document being edited from the displayed version list. In response to the selection, the processor 102 displays the version of the template on the screen, and requests the user to indicate whether or not to incorporate the displayed template in the document. In a case where the user issues an instruction to incorporate the template, the processor 102 incorporates the version of the template in the document.

Here, on the screen displayed in a case where the user selects a version, not only the selected version but also a version generated on the basis of the version may be displayed together. FIG. 13 shows an example of this screen.

Figure 13:
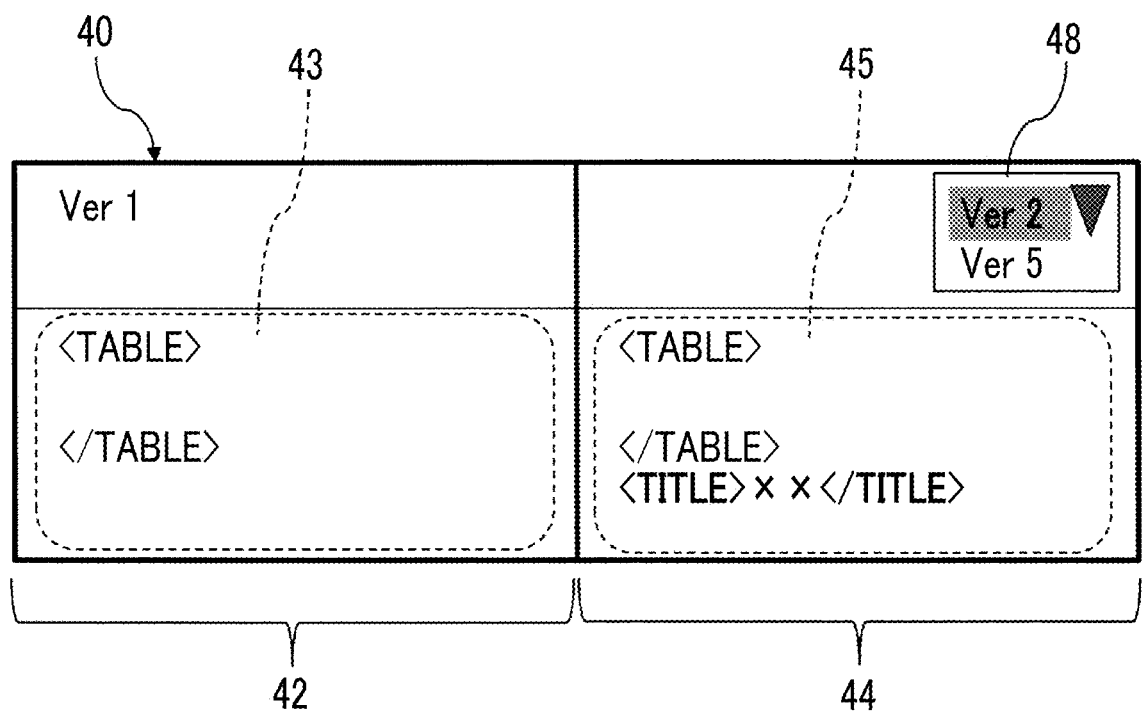
FIG. 13 is a diagram exemplifying a screen presented when a user selects a template to be incorporated in a document, in which a version selected by the user and a version derived therefrom are displayed side by side.

The screen 40 shown in FIG. 13 is displayed in a case where the user selects version 1 in the version list shown in FIG. 12. Information on the selected version is displayed in a field 42 on the left side of the screen 40. In the right column 44, information on a version generated on the basis of the selected version, that is, information on a version having the selected version as a base Ver (hereinafter referred to as a derived version) is displayed. The example shown in the drawing is a case where the version 1 of a certain template is selected. The selected version 1 template is displayed on the display section 43 of the left field 42. In the display section 48 of the right column 44, a list of the derived versions of the selected version 1 is displayed. In a case where the number of derived versions is large, the display section 48 is displayed in a scrollable display form. In a case where the user selects one derived version from the list on the display section 48, the template of the selected derived version is displayed in the display section 45. In the template displayed in the display section 45, the differences from the original version displayed on the left display section 43 are highlighted. The example shown in the drawing is a case where the version 2 is selected from the derived versions. In a case where the user performs an operation of selecting the left display section 43 on this screen 40, a screen for receiving an instruction as to whether or not to incorporate the template displayed on the display section 43 in the document is displayed (not shown). The user inputs an instruction on the screen. Similarly, in a case where the user performs an operation of selecting the right display section 45, a screen for receiving an instruction as to whether or not to incorporate the template displayed on the display section 45 in the document is displayed (not shown). The user inputs an instruction on the screen.

As described above, in the example of FIG. 13, the user examines which template is incorporated in the document while comparing the original version with the template of the derived version. In the example of FIG. 13, the original version and the derived version of the template are displayed side by side on the identical screen (for example, windows), but such a display mode is just an example. For displaying the original version and the derived version, any display mode may be used as long as the display mode allows the two versions to be compared.

Then, the processor 102 registers the second template, which is a new version of the template generated on the basis of the result of editing of the document in which the first template is incorporated, as a derived version of the first template in the document editing system.

The example described with reference to FIGS. 11 to 13 is an example in a case where the template of the new version generated on the basis of the result of editing of the document and the template of the original version of the new version are left in the document editing system.

The above-described exemplary embodiments and modification examples are just examples. The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a processor configured to
   refer to definition information that defines a relationship between components allowed to be included in a template, and
   generate a second template by adding, to a first template, a first component, of which a relationship with a second component included in the first template present in a first template part corresponds to the allowed relationship defined by the definition information, among components which are included in a result of editing of a first document including a second template part copied from the first template and which are added to the first template part through the editing, wherein the first document is a structured document,
   wherein the definition information includes information which indicates a probability that a relationship between components appears in the structured document for each of the relationships, and a threshold value which is a value for the probability corresponding to the relationship between the components and at which the relationship between the components is allowed to be included in the template in a case where the probability is equal to or greater than the threshold value, and wherein the relationship between the components defined in the definition information comprises a sibling relationship and a parent-child relationship.

2. The information processing apparatus according to claim 1, wherein among the components which are included in the result of the editing of the first document including the second template part copied from the first template and which are added to the first template part through the editing, the first component, of which the relationship with the second component included in the first template present in the first template part does not correspond to the allowed relationship defined by the definition information, is not added to the second template.

3. The information processing apparatus according to claim 1,
   wherein the processor is configured to
   cause the second template to not include a deleted component, of which a relationship with an original component included in the first template present in the first template part does not correspond to the allowed relationship defined by the definition information, among deleted components included in the first template but deleted from the first template part through the editing.

4. The information processing apparatus according to claim 2,
   wherein the processor is configured to
   cause the second template to not include a deleted component, of which a relationship with an original component included in the first template present in the first template part does not correspond to the allowed relationship defined by the definition information, among the deleted components included in the first template but deleted from the first template part through the editing.

5. The information processing apparatus according to claim 1,
   wherein the processor is configured to
   store the second template in a storage device in association with the first template, and
   present the first template and the second template in a comparable manner in a case of presenting a user with an option of a template to be incorporated in a document to be edited.

6. The information processing apparatus according to claim 2,
   wherein the processor is configured to
   store the second template in a storage device in association with the first template, and
   present the first template and the second template in a comparable manner in a case of presenting a user with an option of a template to be incorporated in a document to be edited.

7. The infoiniation processing apparatus according to claim 3,
   wherein the processor is configured to
   store the second template in a storage device in association with the first template, and
   present the first template and the second template in a comparable manner in a case of presenting a user with an option of a template to be incorporated in a document to be edited.

8. The infoimation processing apparatus according to claim 1,
   wherein the processor is configured to
   refer to information, which indicates the number of times a component structure is added in a document group edited in advance, for each component structure including a plurality of components, and store a new template, which indicates, among the component structures found from the result of the editing of the first document, the component structure stored in the storage device, for which the number of times the component structure is added reaches a predetermined threshold value, in the storage device.

9. The infoiniation processing apparatus according to claim 1,
wherein the processor is configured to
inquire a user as to whether or not to register the generated second template in a document editing system, and register the second template in the document editing system in a case of receiving an instruction to register from the user.

10. The information processing apparatus according to claim 1,
wherein the first document is the structured document described using a markup language.

11. A non-transitory computer readable medium storing a program for causing a computer to execute functions of:
acquiring definition information that defines a relationship between components allowed to be included in a template, and
generating a second template by adding, to a first template, a first component, of which a relationship with a second component included in the first template present in a first template part corresponds to the allowed relationship defined by the definition information, among components which are included in a result of editing of a first document including a second template part copied from the first template and which are added to the first template part through the editing, wherein the first document is a structured document,
wherein the definition information includes information which indicates a probability that a relationship between components appears in the structured document for each of the relationships, and a threshold value which is a value for the probability corresponding to the relationship between the components and at which the relationship between the components is allowed to be included in the template in a case where the probability is equal to or greater than the threshold value, and wherein the relationship between the components defined in the definition information comprises a sibling relationship and a parent-child relationship.

* * * * *